March 9, 1943.  J. MIHALYI  2,313,567
RANGE AND DEPTH OF FIELD FINDER FOR CAMERAS
Filed July 24, 1940
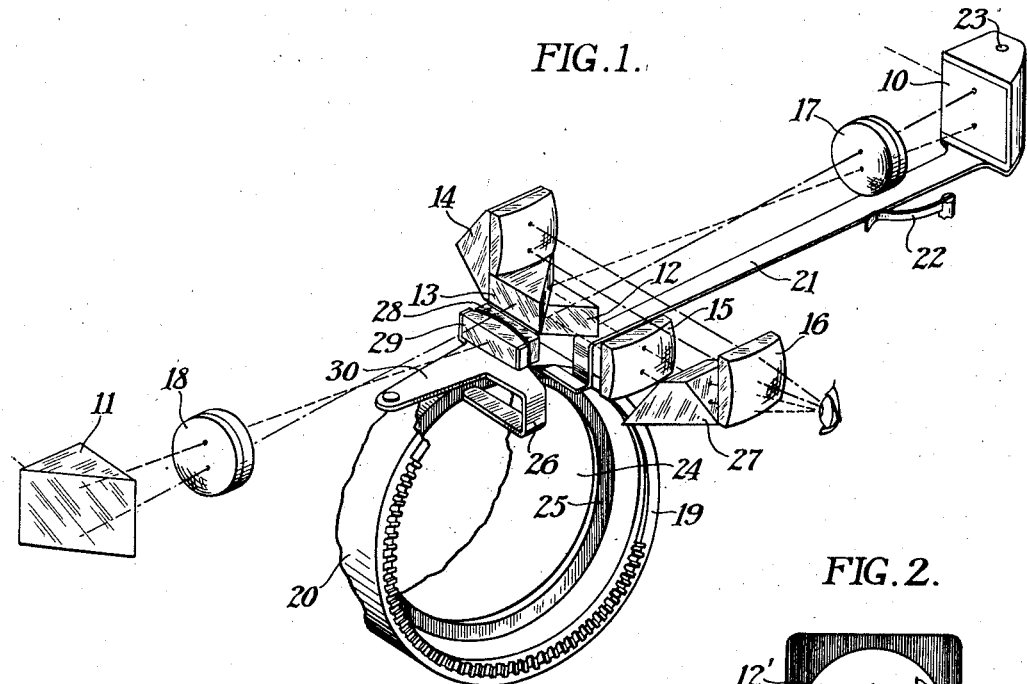
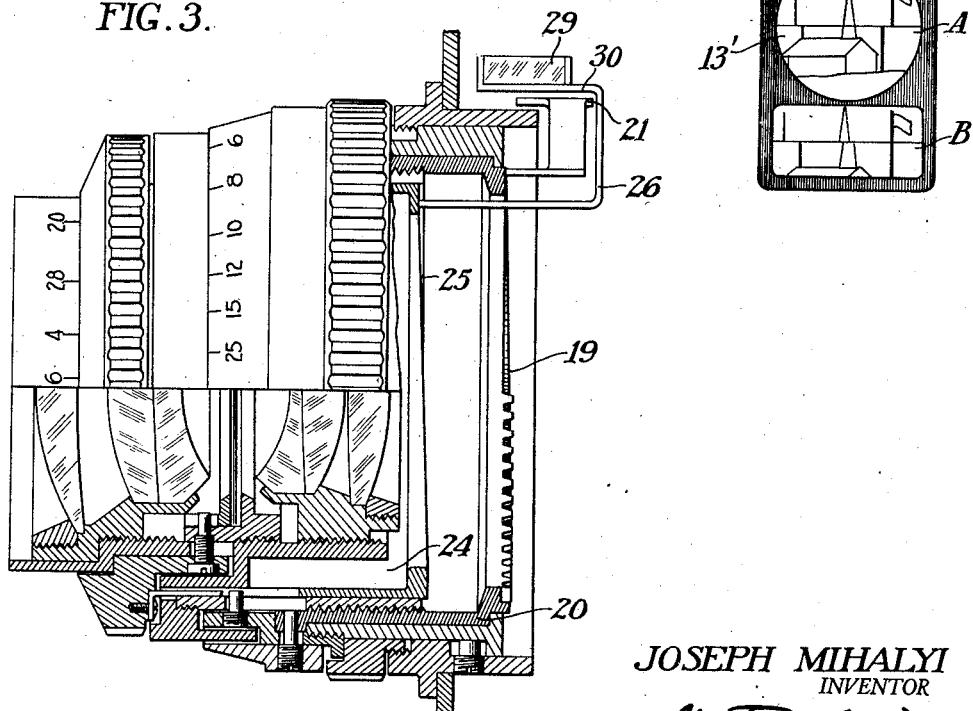
JOSEPH MIHALYI
INVENTOR
BY
ATTORNEYS Patented Mar. 9, 1943

2,313,567

UNITED STATES PATENT OFFICE 2,313,567

RANGE AND DEPTH OF FIELD FINDERS FOR CAMERAS

Joseph Mihalyi, Rochester, N. Y., assignor to Eastman Kodak Company, Rochester, N. Y., a corporation of New Jersey Application July 24, 1940, Serial No. 347,190

4 Claims. (Cl. 95—44)

My present invention relates to photographic apparatus and particularly to cameras provided with range finders coupled to the camera focusing movement for informing the user when the camera is properly focused.

Although a range finder coupled to the focusing mechanism of a camera will inform the operator when he has correctly focused for the distance of the primary object to be photographed, whether or not objects at other distances will be recorded with the desired definition, i. e., are within the "depth of field," is left to the hazard of estimation or more frequently guesswork. In general such estimation or guesswork is most in error with respect to objects which are nearer the camera than the primary object and if the operator can assure himself that a particular near object lies in the depth of field most if not all of his troubles from this cause will be over.

It is an object of my present invention to provide a camera having a coupled range finder with means for showing the nearest object which will be in sharp focus for any particular setting of the camera.

Another object of my invention is the provision of a range finder so designed and constructed that very few additional optical parts are required and without increasing the overall size of the range finder.

Another object of my invention is to utilize in a depth of field finder not only the optics of a range finder but the light which would otherwise be lost in the range finder.

Other objects and advantages of my invention will be clear from the following description when read in connection with the accompanying drawing and its scope will be pointed out in the appended claims.

In the drawing:

Fig. 1 is a partial view, in perspective, showing an arrangement incorporating the invention as coupled to a camera objective;

Fig. 2 shows the fields of view as observed through the eyepiece of the range finder and depth of field finder; and Fig. 3 is a view partly in section showing in detail the operative connection between the movable elements of the finders and the objective.

In accordance with the preferred form of the invention which is particularly applicable to range finders of the type shown in my Patent No. 1,991,110 the rear surfaces of the combining prisms or mirrors are rendered reflecting to direct to the range finder ocular light beams which would otherwise be lost. These reclaimed beams may be employed for indicating depth of focus by positioning in one of the beams a light deviator coupled to the diaphragm adjusting mechanism of the camera objective so that when some special target is brought into coincidence it is known that the depth of focus of the camera objective will include such target.

Referring to the drawing in which has been shown only the structural features necessary to a complete understanding of the invention a range finder is shown as including two end prisms 10 and 11 which collect the range finder beams and direct them along the base line to a beam combining and erecting system comprising prisms 12, 13, and 14 which directs the combined beams rearwardly through lenses 15 and 16 to the eye of an observer. These lenses 15 and 16 form the ocular for the two telescopes having objectives 17 and 18 positioned, respectively, in the two range finder beams prior to their being combined by the prisms 12 and 13. These combined beams appear to the observer as portions 12' and 13' of a divided field A as shown in Fig. 2.

In order to correlate the relative position of the range finder images 12' and 13' with the focus adjustment of the camera, a part movable for changing the focus of the camera is coupled to the range finder in any suitable manner shown here as comprising a cam face 19 provided on the rear of a focusing sleeve 20 of the camera objective and against which an arm 21 is pressed by a spring 22. This arm 21 may be pivoted at 23 for carrying the end prism 10.

The arrangement so far described is merely a well-known coupled range finder suitable for employment in the combination of the present invention. In accordance with the invention, a floating sleeve 24 is mounted in the objective shown in Fig. 3 so as to be rotated in accordance with the adjustment of the diaphragm of the objective and as is fully described in my Patent No. 2,186,616. This sleeve 24 is provided with a facial cam surface 25 for imparting to a suitable cam follower 26 a movement corresponding to any adjustment of the diaphragm of the objective.

The rear surfaces of the prisms 12 and 13 are silvered so that the lower half of the light beam from objective lens 18 and the upper half of the light beam from objective lens 17 are directed through the ocular comprised of lenses 15 and 16. For comfortable viewing a dove prism 27 is positioned in the paths of the beams reflected by the rear surfaces of the prisms 12 and 13 so as to provide an upright divided image which appears as shown in the lower field B of Fig. 2. This divided image is of course substantially the same as the upper divided image and since both are affected by the rotatable end prism 10 they would normally show the same objects in coincidence.

In accordance with the invention, at least one of the image bearing beams of the divided field B is provided with light deviating means controlled by the diaphragm adjustment so as to introduce a corresponding discrepancy between the distances for which the two fields A and B are in coincidence. As shown in Fig. 1 this additional deviating means may comprise a zero power negative-positive lens combination of which the negative lens 28 is stationary and the positive lens 29 is mounted on a support 30 pivoted at the center of curvature of the lens 29. The support 30 has a bent under projection adapted to ride against the cam face 25 whereby the deviating power of the lens combination 28 and 29 is determined by the setting of the adjustable diaphragm.

From the above description it will be evident that both of the finder fields A and B will be adjusted in acordance with the focusing of the objective 20 and that the field B will be further adjusted so as to be set for some distance less than that for which the objective is focused. Such nearer distance is a function of the diaphragm adjustment and thus indicates to the user the nearest object which will be in focus for the particular settings of the objective and diaphragm. In other words, the two fields A and B, respectively, indicate the object distance for which the objective is focused and the nearest object included in the depth of field for the particular diaphragm opening being employed.

If it is desired to employ interchangeable lenses the focusing cam 19 and the diaphragm adjustment cam 25 will of course be constructed with slopes suitable for correct operation of the range finder and the depth of field finder.

The embodiment of the invention described above will enable those skilled in the art to incorporate the invention in other embodiments without departing from the invention, the scope of which is pointed out in the appended claims.

What I claim as new and desire to secure by Letters Patent of the United States is:

1. In a camera, the combination of an objective adjustable for focusing, an adjustable diaphragm associated with the objective, two base type range finders having the same beam accepting members and having a common beam deviating means coupled to the focusing adjustment of the objective, a coupling between one of said range finders and the adjustable diaphragm for decreasing the distance setting of this range finder in strict accordance with the diaphragm adjustment, whereby said one of said range finders indicates the nearest object plane lying in the depth of field for any setting of the objective and its diaphragm.

2. In a camera, the combination of an objective adjustable for focusing, an adjustable diaphragm associated with the objective, and a range and depth of field finder comprising a range finder having two spaced reflectors defining a horizontal base and adapted to accept light beams coming from a distant object and direct them towards each other, means controlled by the focusing adjustment of the objective for correspondingly shifting one of said beams, an ocular, means for directing complemental portions of said beams through the ocular at one angle, means for directing the remaining complemental portions of said beams through the ocular at another angle, whereby two pairs of range finder images are visible through the ocular, and means coupled to a part movable in adjusting the diaphragm for altering the setting of one pair only of said range finder images.

3. In a camera having an objective adjustable for focusing and an adjustable diaphragm, a range and depth of field finder comprising two beam accepting light deflecting elements spaced on a base line, an objective lens in each beam accepted by said elements, means for viewing the two images formed by the objective lenses with corresponding portions thereof interchanged, whereby two pairs of range finder images are provided, means for relatively shifting the images of both pairs in accordance with the distance for which the objective is focused, and means for relatively shifting the images of one pair only in accordance with the diaphragm setting.

4. The combination with a camera objective having an adjustable diaphragm and a part movable for focusing the objective, of two range finders having certain of their optical elements in common and each having a viewing window and optical means for directing a split image of the same field of view through said viewing window, means coupled to the said focusing part for altering the setting of both range finders and means coupled to the adjustable diaphragm for altering the setting of only one of the range finders.

JOSEPH MIHALYI.